(12) United States Patent
Rezazadeh Sereshkeh et al.

(10) Patent No.: US 11,194,448 B2
(45) Date of Patent: Dec. 7, 2021

(54) APPARATUS FOR VISION AND LANGUAGE-ASSISTED SMARTPHONE TASK AUTOMATION AND METHOD THEREOF

(71) Applicant: SAMSUNG ELECTRONICS CO., LTD., Suwon-si (KR)

(72) Inventors: Alborz Rezazadeh Sereshkeh, Toronto (CA); Gary Leung, Toronto (CA); Krish Perumal, Toronto (CA); Iqbal Mohomed, Toronto (CA); Afsaneh Fazly, Toronto (CA); Caleb Phillips, Toronto (CA); Minfan Zhang, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/722,972

(22) Filed: Dec. 20, 2019

(65) Prior Publication Data

US 2020/0285353 A1 Sep. 10, 2020

Related U.S. Application Data

(60) Provisional application No. 62/813,616, filed on Mar. 4, 2019, provisional application No. 62/929,223, filed on Nov. 1, 2019.

(51) Int. Cl.
*G06F 3/0482* (2013.01)
*G06F 9/445* (2018.01)
(Continued)

(52) U.S. Cl.
CPC .......... *G06F 3/0482* (2013.01); *G06F 3/0485* (2013.01); *G06F 3/04883* (2013.01);
(Continued)

(58) Field of Classification Search
CPC ........ G06F 3/0482; G06F 9/445; G06F 3/167; G06F 3/04883; G06F 3/0485; G06T 7/70; G06K 9/46; G06K 2209/01
See application file for complete search history.

(56) References Cited

U.S. PATENT DOCUMENTS 5,566,295 A 10/1996 Cypher et al.
7,505,817 B2 3/2009 McDaniel et al.
(Continued)

FOREIGN PATENT DOCUMENTS

KR 10-2019-0001865 A 1/2019
WO 2017044163 A1 3/2017
WO 2018175291 A1 9/2018

OTHER PUBLICATIONS

Li et al., "SUGILITE: Creating Multimodal Smartphone Automation by Demonstration", published May 2017, downloaded from http://library.usc.edu.ph/ACM/CHI%202017/1proc/p6038.pdf (Year: 2017).*

Li et al., "APPINITE: A Multi-Modal Interface for Specifying Data Descriptions in Programming by Demonstration Using Natural Language Instructions", published 2018, downloaded from http://www.cs.cmu.edu/afs/cs.cmu.edu/Web/People/natprog/papers/p105-li.pdf (Year: 2018).*

(Continued)

*Primary Examiner* — Jennifer N Welch
*Assistant Examiner* — Amy P Hoang
(74) *Attorney, Agent, or Firm* — Sughrue Mion, PLLC

(57) ABSTRACT

An apparatus for vision and language-assisted smartphone task automation, includes a processor configured to execute instructions to identify whether an utterance of a user refers to one among at least one existing automation script, and based on the utterance being identified to not refer to the one among the at least one existing automation script, capture one or more screenshots and one or more coordinates of a display, the one or more screenshots and the one or more coordinates corresponding to one or more interactions of the user with the display while the user is demonstrating a new automation script, perform object detection and optical character recognition on the captured one or more screen- (Continued)

shots and the captured one or more coordinates to obtain user interface (UI) elements corresponding to the one or more interactions, and obtain the new automation script, based on the obtained UI elements.

17 Claims, 9 Drawing Sheets

(51) Int. Cl.
    *G06F 3/16*     (2006.01)
    *G06T 7/70*     (2017.01)
    *G06F 3/0488*     (2013.01)
    *G06F 3/0485*     (2013.01)
    *G06K 9/46*     (2006.01)

(52) U.S. Cl.
    CPC .............. *G06F 3/167* (2013.01); *G06F 9/445* (2013.01); *G06K 9/46* (2013.01); *G06T 7/70* (2017.01); *G06K 2209/01* (2013.01)

(56) References Cited

U.S. PATENT DOCUMENTS

| | | | |
|---|---|---|---|
| 8,606,773 | B2 | 12/2013 | Cypher et al. |
| 9,891,895 | B2 | 2/2018 | Gulwani et al. |
| 10,216,372 | B1 | 2/2019 | Kachmar et al. |
| 2004/0267515 | A1* | 12/2004 | McDaniel .......... G05B 19/0426 703/22 |
| 2017/0132019 | A1 | 5/2017 | Karashchuk et al. |
| 2017/0337478 | A1 | 11/2017 | Sarikaya et al. |
| 2018/0336905 | A1 | 11/2018 | Kim et al. |
| 2019/0265990 | A1* | 8/2019 | Hall .................... G06F 9/451 |
| 2020/0193331 | A1* | 6/2020 | Larson ................ G06K 9/6256 |

OTHER PUBLICATIONS

International Search Report and Written Opinion (PCT/ISA/210 and PCT/ISA/237), dated May 14, 2020 by International Searching Authority in International Application No. PCT/KR2020/001652.

\* cited by examiner

APPARATUS FOR VISION AND LANGUAGE-ASSISTED SMARTPHONE TASK AUTOMATION AND METHOD THEREOF

CROSS-REFERENCE TO RELATED APPLICATION

This application claims priority from U.S. Provisional Patent Application No. 62/813,616, filed on Mar. 4, 2019, in the U.S. Patent and Trademark Office, and U.S. Provisional Patent Application No. 62/929,223, filed on Nov. 1, 2019, in the U.S. Patent and Trademark Office, the disclosures of which are incorporated by reference herein in their entireties.

BACKGROUND

1. Field

The disclosure relates to automation, and more particularly, to an apparatus for vision and language-assisted smartphone task automation and a method thereof.

2. Description of Related Art

Smartphones provide a sophisticated set of tools and applications that allow users to perform many complex tasks. Given the diversity of existing tasks and the ever-increasing amount of time users spend on their phones, automating the most tedious and repetitive tasks (such as ordering a pizza or checking one's grades using a school application) is a desirable goal for smartphone manufacturers and users alike.

Intelligent assistants can be used to automate and voice-enable particular tasks such as web search and device control. However, the functionality of such agents is usually limited to built-in smartphone applications (message, calendar, etc.) and a small number of integrated web services and external applications. In other words, they are unable to control most third-party applications due to the significant variations in applications and tasks.

SUMMARY

According to embodiments, an apparatus for vision and language-assisted smartphone task automation, includes a memory storing instructions, and a processor configured to execute the instructions to identify whether an utterance of a user refers to one among at least one existing automation script, based on the utterance being identified to not refer to the one among the at least one existing automation script, capture one or more screenshots and one or more coordinates of a display, the one or more screenshots and the one or more coordinates corresponding to one or more interactions of the user with the display while the user is demonstrating a new automation script, perform object detection and optical character recognition on the captured one or more screenshots and the captured one or more coordinates to obtain user interface (UI) elements corresponding to the one or more interactions, and obtain the new automation script, based on the obtained UI elements, the new automation script being included among the at least one existing automation script, and based on the utterance being identified to refer to the one among the at least one existing automation script, perform the one among the at least one existing automation script.

The processor may be further configured to execute the instructions to, based on the utterance being identified to refer to the one among the at least one existing automation script, identify whether the utterance includes a new parameter different from an existing parameter included in the one among the at least one existing automation script, and based on the utterance being identified to include the new parameter, update the one among the at least one existing automation script, based on the new parameter, and perform the updated one among the at least one existing automation script.

The processor may be further configured to execute the instructions to obtain, from the obtained new automation script, one or more keyboard inputs, remove unnecessary ones of the one or more keyboard inputs and combine remaining ones of the one or more keyboard inputs, to obtain a single text instruction, and replace the one or more keyboard inputs included in the obtained new automation script, with the obtained single text instruction, to refine the new automation script, the refined new automation script being included among the at least one existing automation script.

The processor may be further configured to execute the instructions to encode the utterance, using a Universal Sentence Encoder, obtain a similarity between the encoded utterance and a centroid of a cluster of utterances, identify whether the similarity is greater than or equal to a predetermined threshold, based on the similarity being identified to be greater than or equal to the predetermined threshold, identify that the utterance refers to the one among the at least one existing automation script, and based on the similarity being identified to be less than the predetermined threshold, identify that the utterance does not refer to the one among the at least one existing automation script.

The processor may be further configured to execute the instructions to identify whether one among the obtained UI elements is one among an application start-up button, a keyboard, a static UI element and a non-static UI element, based on the one among the obtained UI elements being identified to be the application start-up button, record, in the new automation script, a name of an application corresponding to the application start-up button, based on the one among the obtained UI elements being identified to be the keyboard, combine consecutive typing steps into a typed message, and record the typed message in the new automation script, based on the one among the obtained UI elements being identified to be the static UI element, record, in the new automation script, coordinates of a first input on the static UI element, and based on the one among the obtained UI elements being identified to be the non-static UI element, obtain an image of the non-static UI element, perform the object detection on a respective one of the captured one or more screenshots to obtain a bounding box of the non-static UI element, and perform the optical character recognition on the respective one of the captured one or more screenshots to obtain a text on the non-static UI element.

The processor may be further configured to execute the instructions to identify whether a task included in the existing automation script is one among an application start-up event, a keyboard interaction, the first input on the static UI element and a second input on the non-static UI element, based on the task being identified to be the application start-up event, launch the application based on the recorded name of the application, based on the task being identified to be the keyboard interaction, type the recorded typed message, based on the task being identified to be the first input on the static UI element, perform the first input on the recorded coordinates of the first input on the static UI element, and based on the task being identified to be the second input on the non-static UI element, obtain a location of the non-static UI element, based on the obtained image of the non-static UI element, the obtained bounding box of the non-static UI element, and the obtained text on the non-static UI element, and perform the second input on the obtained location of the non-static UI element.

The processor may be further configured to execute the instructions to identify whether a task included in the new automation script corresponds to one among an application start-up event, multiple swipes or scrolling and a mistaken click, based on the task being identified to correspond to the application start-up event, replace, in the new automation script, one or more manual application start-up inputs corresponding to the application start-up event, with an automatic launch command for an application corresponding to the application start-up event, based on the task being identified to correspond to the multiple swipes or scrolling, replace, in the new automation script, the multiple swipes or scrolling, with a command to find one among the obtained UI elements, and based on the task being identified to correspond to the mistaken click, remove, from the new automation script, the mistaken click.

According to embodiments, a method of vision and language-assisted smartphone task automation, includes identifying whether an utterance of a user refers to one among at least one existing automation script, based on the utterance being identified to not refer to the one among the at least one existing automation script, capturing one or more screenshots and one or more coordinates of a display, the one or more screenshots and the one or more coordinates corresponding to one or more interactions of the user with the display while the user is demonstrating a new automation script, performing object detection and optical character recognition on the captured one or more screenshots and the captured one or more coordinates to obtain user interface (UI) elements corresponding to the one or more interactions, and obtaining the new automation script, based on the obtained UI elements, the new automation script being included among the at least one existing automation script, and based on the utterance being identified to refer to the one among the at least one existing automation script, performing the one among the at least one existing automation script.

The method may further include, based on the utterance being identified to refer to the one among the at least one existing automation script, identifying whether the utterance includes a new parameter different from an existing parameter included in the one among the at least one existing automation script, and based on the utterance being identified to include the new parameter, updating the one among the at least one existing automation script, based on the new parameter, and performing the updated one among the at least one existing automation script.

The method may further include obtaining, from the obtained new automation script, one or more keyboard inputs, removing unnecessary ones of the one or more keyboard inputs and combine remaining ones of the one or more keyboard inputs, to obtain a single text instruction, and replacing the one or more keyboard inputs included in the obtained new automation script, with the obtained single text instruction, to refine the new automation script, the refined new automation script being included among the at least one existing automation script.

The identifying whether the utterance refers to the one among the at least one existing automation script may include encoding the utterance, using a Universal Sentence Encoder, obtaining a similarity between the encoded utterance and a centroid of a cluster of utterances, identifying whether the similarity is greater than or equal to a predetermined threshold, based on the similarity being identified to be greater than or equal to the predetermined threshold, identifying that the utterance refers to the one among the at least one existing automation script, and based on the similarity being identified to be less than the predetermined threshold, identifying that the utterance does not refer to the one among the at least one existing automation script.

The obtaining the new automation script may include identifying whether one among the obtained UI elements is one among an application start-up button, a keyboard, a static UI element and a non-static UI element, based on the one among the obtained UI elements being identified to be the application start-up button, recording, in the new automation script, a name of an application corresponding to the application start-up button, based on the one among the obtained UI elements being identified to be the keyboard, combining consecutive typing steps into a typed message, and record the typed message in the new automation script, based on the one among the obtained UI elements being identified to be the static UI element, recording, in the new automation script, coordinates of a first input on the static UI element, and based on the one among the obtained UI elements being identified to be the non-static UI element, obtaining an image of the non-static UI element, performing the object detection on a respective one of the captured one or more screenshots to obtain a bounding box of the non-static UI element, and performing the optical character recognition on the respective one of the captured one or more screenshots to obtain a text on the non-static UI element.

The performing the one among the at least one existing automation script may include identifying whether a task included in the existing automation script is one among an application start-up event, a keyboard interaction, the first input on the static UI element and a second input on the non-static UI element, based on the task being identified to be the application start-up event, launching the application based on the recorded name of the application, based on the task being identified to be the keyboard interaction, typing the recorded typed message, based on the task being identified to be the first input on the static UI element, performing the first input on the recorded coordinates of the first input on the static UI element, and based on the task being identified to be the second input on the non-static UI element, obtaining a location of the non-static UI element, based on the obtained image of the non-static UI element, the obtained bounding box of the non-static UI element, and the obtained text on the non-static UI element, and performing the second input on the obtained location of the non-static UI element.

The method may further include identifying whether a task included in the new automation script corresponds to one among an application start-up event, multiple swipes or scrolling and a mistaken click, based on the task being identified to correspond to the application start-up event, replacing, in the new automation script, one or more manual application start-up inputs corresponding to the application start-up event, with an automatic launch command for an application corresponding to the application start-up event, based on the task being identified to correspond to the multiple swipes or scrolling, replacing, in the new automation script, the multiple swipes or scrolling, with a command to find one among the obtained UI elements, and based on the task being identified to correspond to the mistaken click, removing, from the new automation script, the mistaken click.

According to embodiments, a non-transitory computer-readable storage medium stores instructions to cause a processor to identify whether an utterance of a user refers to one among at least one existing automation script, based on the utterance being identified to not refer to the one among the at least one existing automation script, capture one or more screenshots and one or more coordinates of a display, the one or more screenshots and the one or more coordinates corresponding to one or more interactions of the user with the display while the user is demonstrating a new automation script, perform object detection and optical character recognition on the captured one or more screenshots and the captured one or more coordinates to obtain user interface (UI) elements corresponding to the one or more interactions, and obtain the new automation script, based on the obtained UI elements, the new automation script being included among the at least one existing automation script, and based on the utterance being identified to refer to the one among the at least one existing automation script, perform the one among the at least one existing automation script.

The instructions may further cause the processor to, based on the utterance being identified to refer to the one among the at least one existing automation script, identify whether the utterance includes a new parameter different from an existing parameter included in the one among the at least one existing automation script, and based on the utterance being identified to include the new parameter, update the one among the at least one existing automation script, based on the new parameter, and perform the updated one among the at least one existing automation script.

The instructions may further cause the processor to obtain, from the obtained new automation script, one or more keyboard inputs, remove unnecessary ones of the one or more keyboard inputs and combine remaining ones of the one or more keyboard inputs, to obtain a single text instruction, and replace the one or more keyboard inputs included in the obtained new automation script, with the obtained single text instruction, to refine the new automation script, the refined new automation script being included among the at least one existing automation script.

The instructions may further cause the processor to encode the utterance, using a Universal Sentence Encoder, obtain a similarity between the encoded utterance and a centroid of a cluster of utterances, identify whether the similarity is greater than or equal to a predetermined threshold, based on the similarity being identified to be greater than or equal to the predetermined threshold, identify that the utterance refers to the one among the at least one existing automation script, and based on the similarity being identified to be less than the predetermined threshold, identify that the utterance does not refer to the one among the at least one existing automation script.

The instructions may further cause the processor to identify whether one among the obtained UI elements is one among an application start-up button, a keyboard, a static UI element and a non-static UI element, based on the one among the obtained UI elements being identified to be the application start-up button, record, in the new automation script, a name of an application corresponding to the application start-up button, based on the one among the obtained UI elements being identified to be the keyboard, combine consecutive typing steps into a typed message, and record the typed message in the new automation script, based on the one among the obtained UI elements being identified to be the static UI element, record, in the new automation script, coordinates of a first input on the static UI element, and based on the one among the obtained UI elements being identified to be the non-static UI element, obtain an image of the non-static UI element, perform the object detection on a respective one of the captured one or more screenshots to obtain a bounding box of the non-static UI element, and perform the optical character recognition on the respective one of the captured one or more screenshots to obtain a text on the non-static UI element.

The instructions may further cause the processor to identify whether a task included in the existing automation script is one among an application start-up event, a keyboard interaction, the first input on the static UI element and a second input on the non-static UI element, based on the task being identified to be the application start-up event, launch the application based on the recorded name of the application, based on the task being identified to be the keyboard interaction, type the recorded typed message, based on the task being identified to be the first input on the static UI element, perform the first input on the recorded coordinates of the first input on the static UI element, and based on the task being identified to be the second input on the non-static UI element, obtain a location of the non-static UI element, based on the obtained image of the non-static UI element, the obtained bounding box of the non-static UI element, and the obtained text on the non-static UI element, and perform the second input on the obtained location of the non-static UI element.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects and features of embodiments of the disclosure will be more apparent from the following description taken in conjunction with the accompanying drawings, in which.

DETAILED DESCRIPTION

Figure 1:
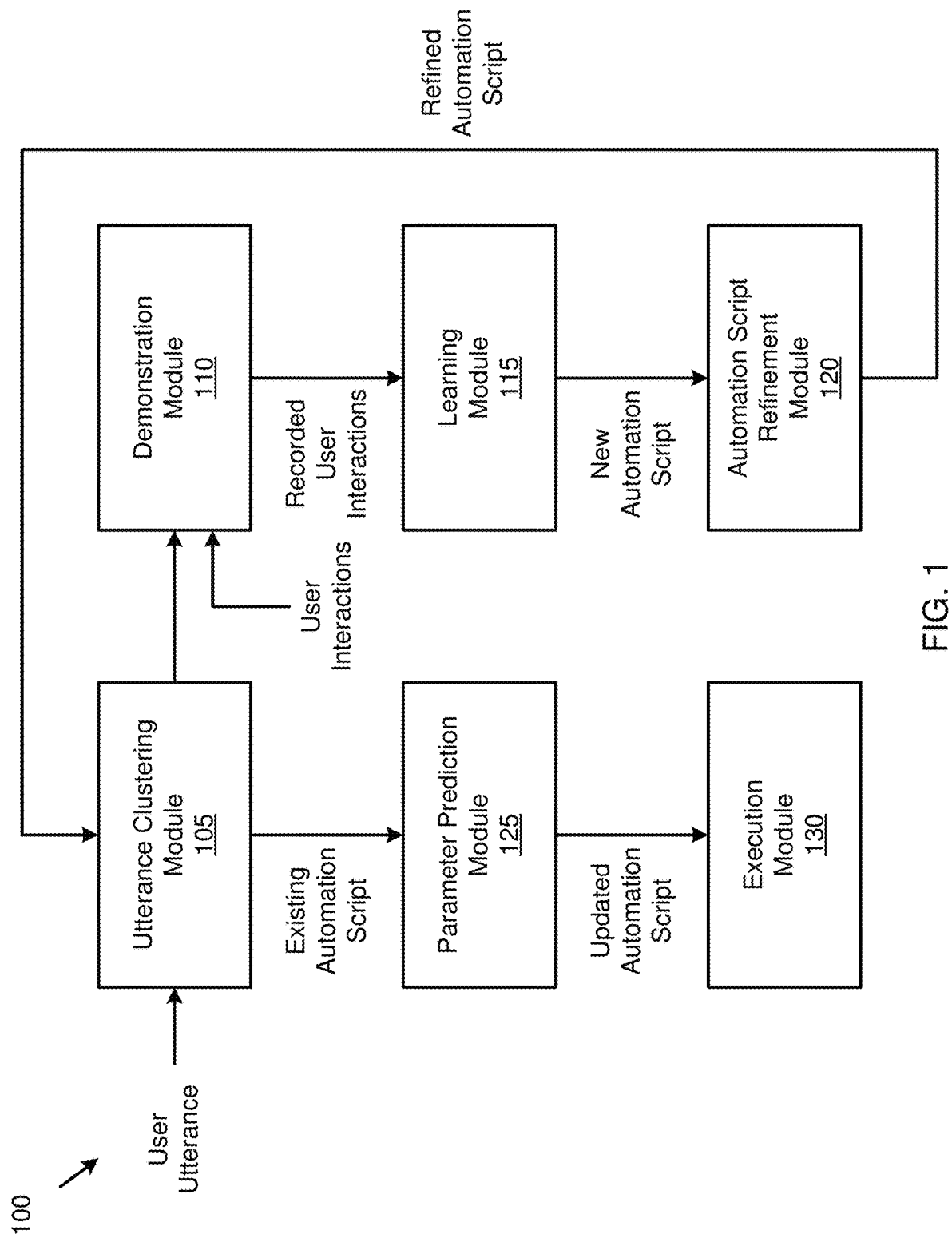
FIG. 1 is a block diagram of an apparatus for vision and language-assisted smartphone task automation, according to embodiments.

Given the ever-evolving landscape of applications and tools available, a smartphone task-automation solution may overcome the following challenges: 1) being agnostic to the applications, user inputs (e.g., taps and swipes), and UI elements involved in a task; 2) being robust to positional changes (e.g., shifts in locations of UI elements) and visual changes (e.g., changes caused by updates) in applications; 3) being able to recognize from a user utterance what automation a user wishes to carry out (e.g., a new automation script or one that is previously learned); and 4) being able to recognize changes in automation parameters using the user utterance (e.g., a pizza type in a pizza ordering task).

Embodiments of the disclosure address the above challenges by providing an apparatus for vision and language-assisted smartphone task automation and a method thereof. The embodiments include a Programming-by-Demonstration (PBD) system that leverages vision and language algorithms to enable a smartphone user to create and execute an automation script for arbitrary tasks using any or multiple third-party applications. Moreover, a demonstration is a sequence of actions that the user would perform in the course of their task (not requiring any special annotations or scripting by the user), thus making the approach more accessible to non-expert end-users. Relying on capturing a screen's state and (x,y)-coordinates of a user interaction, this system can provide intelligent vision-based automation to any application, and potentially platform, where these fields are available.

The embodiments further provide a natural language understanding component to automatically cluster user utterances belonging to the same task, and predict their parameters. Also included is an object detection neural network for detecting UI elements based on an object detection model trained on a large dataset of UI elements.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) or convolutional neural network (CNN) is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a block diagram of an apparatus 100 for vision and language-assisted smartphone task automation, according to embodiments.

As shown in FIG. 1, the apparatus 100 includes an utterance clustering module 105, a demonstration module 110, a learning module 115, an automation script refinement module 120, a parameter prediction module 125 and an execution module 130.

The apparatus 100 may be implemented by any electronic device including, for example, a smartphone, a table, a laptop, or a personal computer.

The utterance clustering module 105 obtains a user utterance that may include a voice command of a user, and converts the obtained user utterance to text. The user utterance may be obtained via an input interface including, for example, a microphone, a camera or any combination thereof.

The utterance clustering module 105 determines whether the textual user utterance refers to a new automation script or an existing automation script. An automation script may include a list of one or more tasks that are demonstrated by the user and later executed. The one or more tasks may be Android debugging bridge (ADB) commands. The utterance clustering module 105 may determine whether the textual user utterance refers to the new automation script or the existing automation script, using natural language understanding (NLU) algorithms. For example, the utterance clustering module 105 may determine whether the textual user utterance is in a same cluster of user utterances as that of one or more prior user utterances. The same cluster includes the user utterances that are variations of the same task or command with the same or similar parameters or words. Based on the textual user utterance being determined to be in the same cluster as that of the one or more prior user utterances, the utterance clustering module 105 may determine that the textual user utterance refers to the existing automation script.

In a use case, the user may have trained only one task for finding the nearest Italian restaurants, using an original utterance "Get me the closest Italian restaurants." The user may then input a new utterance "Find nearest Chinese restaurants." The utterance clustering module 105 determines that this new utterance belongs to a same cluster of user utterances as that of the original utterance, and thus, the new utterance refers to an existing automation script. However, if the user inputs another new utterance "Book tickets from Toronto to NYC," the utterance clustering module 105 determines that this other new utterance does not belong to the same cluster as that of the original utterance, and thus, the other new utterance refers to a new automation script. Further description of the utterance clustering module 105 will be made with reference to FIGS. 3A and 3B below.

Based on the textual user utterance being determined to refer to the new automation script, the demonstration module 110 indicates to the user that the apparatus 100 does not know the new automation script and requests that the user demonstrate the new automation script for the apparatus 100. For example, the demonstration module 110 may control an output interface to output a voice and/or textual message, "I do not know how to do that. Can you show me?" The output interface may include, for example, a speaker, a display, or any combination thereof.

Based on an affirmative reply to the request (e.g., "yes") being obtained from the user via the input interface, the demonstration module 110 starts a demonstration phase in which the demonstration module 110 records user interactions or tasks of the user with respect to, e.g., a smartphone. The user interactions may be recorded via the input interface including, for example, the microphone, the camera, a touchscreen, a keyboard, a mouse or any combination thereof. The demonstration module 110 may end the demonstration phase, based on a user input, e.g., the user shaking his or her smartphone.

In detail, at the start of the demonstration phase, the demonstration module 110 navigates to a home screen of the smartphone and kills all running application processes to ensure a comparable starting point during execution later. Then, the demonstration module 110 uses an ADB connection to capture a current state of a screen (a screenshot) at each user interaction as well as a type of a user touch event, including a tap, a long tap, and a swipe. For a tap and a long tap, the demonstration module 110 logs (x,y)-coordinates and a duration of a click. For a swipe, the demonstration module 110 logs (x,y)-coordinates of a first touch and a last touch, as well as a duration of a swipe.

Despite capturing a screenshot immediately upon detecting a user interaction, there may be significant and varied delay between an actual moment the user interacts with the smartphone, and a state that is captured. This delay may be significant enough that the captured state is completely different from a state that the user interacted with. To mitigate this, the demonstration module 110 records a video in tandem with the screenshot and the detected user interaction. To ensure that the screen state has been captured exactly as it was interacted with by the user, the demonstration module 110 replaces the captured screenshot with a last frame that occurred prior to the user interaction from the recorded video.

Based on the demonstration phase ending, the learning module 115 starts a learning phase in which the learning module 115 obtains the recorded user interactions from the demonstration module 110 and obtains or learns the new automation script based on the obtained recorded user interactions. In detail, the learning module 115 recognizes, using an object detection neural network, (x,y)-coordinates of bounding boxes of UI elements that the user interacted with at each step of the demonstration. The object detection neural network may include a pre-trained CNN or region proposal network (RPN) such as RetinaNet.

Further, the learning module 115 may recognize, using an NLU neural network, another user utterance included in the obtained recorded user interactions, and may recognize, using an object character recognition (OCR) neural network, a message that the user typed and/or textual information in pixels of the recognized bounding boxes of the UI elements that the user clicked on. Each of the NLU neural network and the OCR neural network may include a pre-trained CNN. The OCR neural network may include Tesseract.

The above-recognized items may be used to obtain the new automation script. For every user interaction, the learning module 115 uses the captured screenshot (and/or the last frame prior thereto), the recognized coordinates of the bounding boxes of the UI elements, the recognized user utterance and/or the recognized typed message and/or textual information on the UI elements, to determine a type of a UI element that the user interacted with.

Types of UI elements that the user may interact with include 1) a static UI element, 2) a keyboard, 3) an application start-up button and 4) a non-static UI element. The static UI element may include one among system-level elements, for example, a home button and a menu drop-down area at a top of an electronic device, whose look and positioning remain the same regardless of applications. The keyboard may be detected on a screen using pattern matching vision algorithms. The non-static UI element may include any element that does not fall within the other three categories. The learning module 115 processes each of these four types of UI elements differently as will be discussed with reference to FIG. 4A below.

Based on the learning phase ending, the user can execute the new automation script as an existing automation script, with the same textual user utterance. Further description of the learning module 115 will be made with reference to FIGS. 4A and 4B below.

The automation script refinement module 120 obtains the obtained new automation script from the learning module 115, and filters or removes at least one unnecessary action from the obtained new automation script to obtain a refined automation script. In detail, the user may make mistakes or perform unnecessary steps when he or she demonstrates a task to the apparatus 100. The automation script refinement module 120 detects and removes these mistakes and steps from the obtained new automation script, to avoid replicating the mistakes and steps when executing the same task. Refining the obtained new automation script leads to automations that are faster to execute, and hence, save the user's time.

The user can execute the refined automation script as an existing automation script, with the same textual user utterance. Further description of the automation script refinement module 120 will be made with reference to FIG. 5 below.

Based on the textual user utterance being determined to refer to the existing automation script, the parameter prediction module 125 determines or predicts whether the textual user utterance includes a new parameter or variation in comparison to one or more prior user utterances in the same cluster of user utterances as that of the textual user utterance. The parameter prediction module 125 may determine whether the textual user utterance includes the new parameter, using NLU algorithms.

In a use case, when a new utterance "Find nearest Chinese restaurants" is added to a cluster containing a prior utterance "Get me the closest Italian restaurants" with a known parameter "Italian," the parameter prediction module 125 identifies that "Chinese" is a new parameter of the new utterance.

For predicting parameters, the parameter prediction module 125 uses multiple linguistic cues such as word lemmas, part-of-speech (POS) tags, word embeddings and dependency parse representations. The dependency parse representations of a sentence provides a grammatical relationship between each pair of words in the user utterance. For example, in the utterance "Get me the closest Italian restaurants," the dependency parse representation indicates an adjective modifier dependency from "Italian" to "restaurants." Analogously, in another utterance such as "Find nearest Chinese restaurants", the dependency parse indicates the same relationship from "Chinese" to "restaurants." This dependency similarity between words in two different utterances is leveraged, and known parameters in a canonical utterance are matched to predict parameters in a new utterance.

In detail, the parameter prediction module 125 creates a bipartite graph such that each node in a dependency parse representation of the canonical utterance is connected to each node in a dependency parse representation of the new utterance. An edge weight is a score including 1) a cosine similarity between the two nodes' word embeddings, 2) an exact match of lemmas of the nodes and their neighbors, 3) an exact match of POS tags of the nodes and their neighbors, and 4) an exact match of dependency labels of the two nodes' edges. Then, the parameter prediction module 125, using a maximum weighted bipartite graph matching algorithm, finds the parameters in the new utterance that match with the known parameters in the canonical utterance.

Based on the textual user utterance being determined to include the new parameter, the parameter prediction module 125 updates the existing automation script to obtain an updated automation script in which one or more tasks are updated based on the new parameter. For example, a message that the user typed in a step of the existing automation script may be updated by replacing a word with the new parameter that is another word. In this way, the parameter prediction module 125 generalizes automation of similar smartphone tasks, i.e., if the user repeats an utterance with a different parameter.

The execution module 130 obtains the updated automation script and starts an execution phase in which the execution module 130 executes the existing automation script that may be updated. In detail, at the start of the execution phase, the execution module 130 navigates to the home screen and kills all running application processes to ensure starting conditions stay consistent with recording conditions. The execution module 130 then executes each task or ADB command included in the existing automation script one by one.

During the execution of the existing automation script, if locations of the UI elements are different those recognized in the demonstration phase, the execution module 130 is still able to find a target UI element, using the same object detection neural network used for the learning phase. Further during the execution of the existing automation script, if there are visual changes to the UI elements (e.g., due to updates or theming), the execution module 130 is still able to find the target UI element, using the OCR neural network. Further description of the execution module 130 will be made with reference to FIG. 6 below.

The apparatus 100 may be implemented through a dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the apparatus 100 may be configured by a plurality of processors. In this case, the apparatus 100 may be implemented through a combination of dedicated processors or through a combination of software and general-purpose processors such as AP, CPU or GPU.

Further, the apparatus 100 may include a CPU, a memory, and a computer program including instructions. The computer program is stored in the memory. The apparatus 100 may respectively perform functions described with reference to FIGS. 1-6 according to execution of the computer program by the CPU. The functions described with reference to FIGS. 1-6 are performed by a dedicated hardware chip and/or the CPU.

Figure 2:
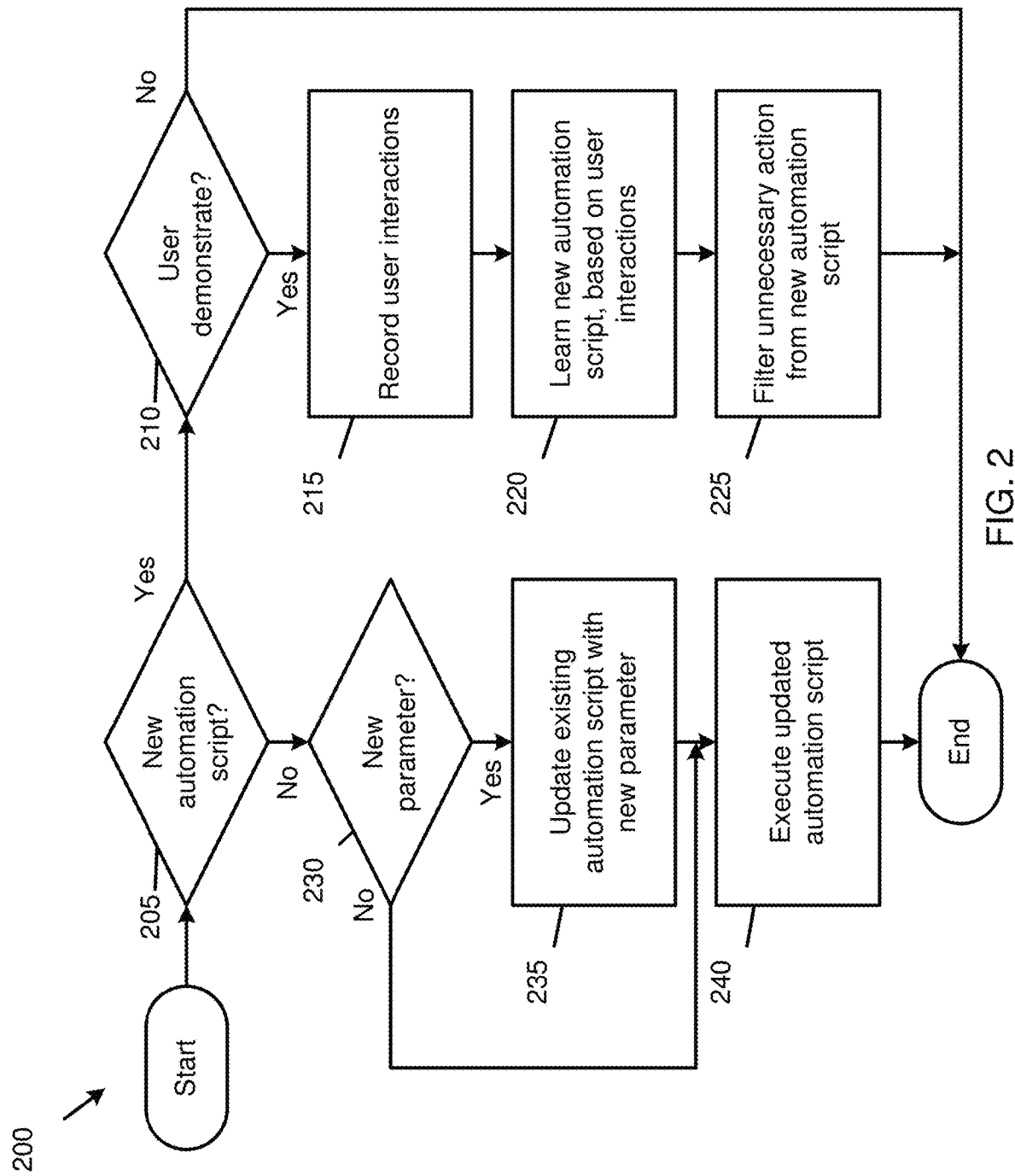
FIG. 2 is a flowchart of a method of vision and language-assisted smartphone task automation, according to embodiments.

FIG. 2 is a flowchart of a method 200 for vision and language-assisted smartphone task automation, according to embodiments.

Referring to FIG. 2, the method 200 may be performed by the apparatus 100 of FIG. 1.

In operation 205, the method 200 includes determining whether a user utterance of a user refers to a new automation script. Based on the user utterance being determined to refer to the new automation scrip, the method 200 continues in operation 210. Otherwise, the method 200 continues in operation 230. Further description of the operation 205 will be made with reference to FIGS. 3A and 3B below.

In the operation 210, the method 200 includes indicating to the user that the apparatus 100 does not know the new automation script, requesting that the user demonstrate the new automation script for the apparatus 100 and determining whether an affirmative reply to the request is obtained from the user. Based on the affirmative reply being determined to be obtained, the method 200 continues in operation 215. Otherwise, the method 200 ends.

In the operation 215, the method 200 includes recording user interactions of the user with respect to, e.g., a smartphone.

In operation 220, the method 200 includes learning the new automation script, based on the recorded user interactions. The user can execute the new automation script as an existing automation script, with the same user utterance. Further description of the operation 220 will be made with reference to FIGS. 4A and 4B below.

In operation 225, the method 200 includes filtering at least one unnecessary action from the learned new automation script, based on the recorded user interactions, to obtain a refined automation script. The user can execute the refined automation script as an existing automation script, with the same user utterance. Further description of the operation 225 will be made with reference to FIG. 5 below.

In the operation 230, the method 200 includes determining whether the user utterance includes a new parameter in comparison to one or more prior user utterances in the same cluster of user utterances as that of the user utterance. Based on the user utterance being determined to include the new parameter, the method 200 continues in operation 235. Otherwise, the method 200 continues in operation 240.

In the operation 235, the method 200 includes updating an existing automation script to which the user utterance refers, with the new parameter included in the user utterance.

In the operation 240, the method 200 includes executing the existing automation script that may be updated.

Figure 3A:
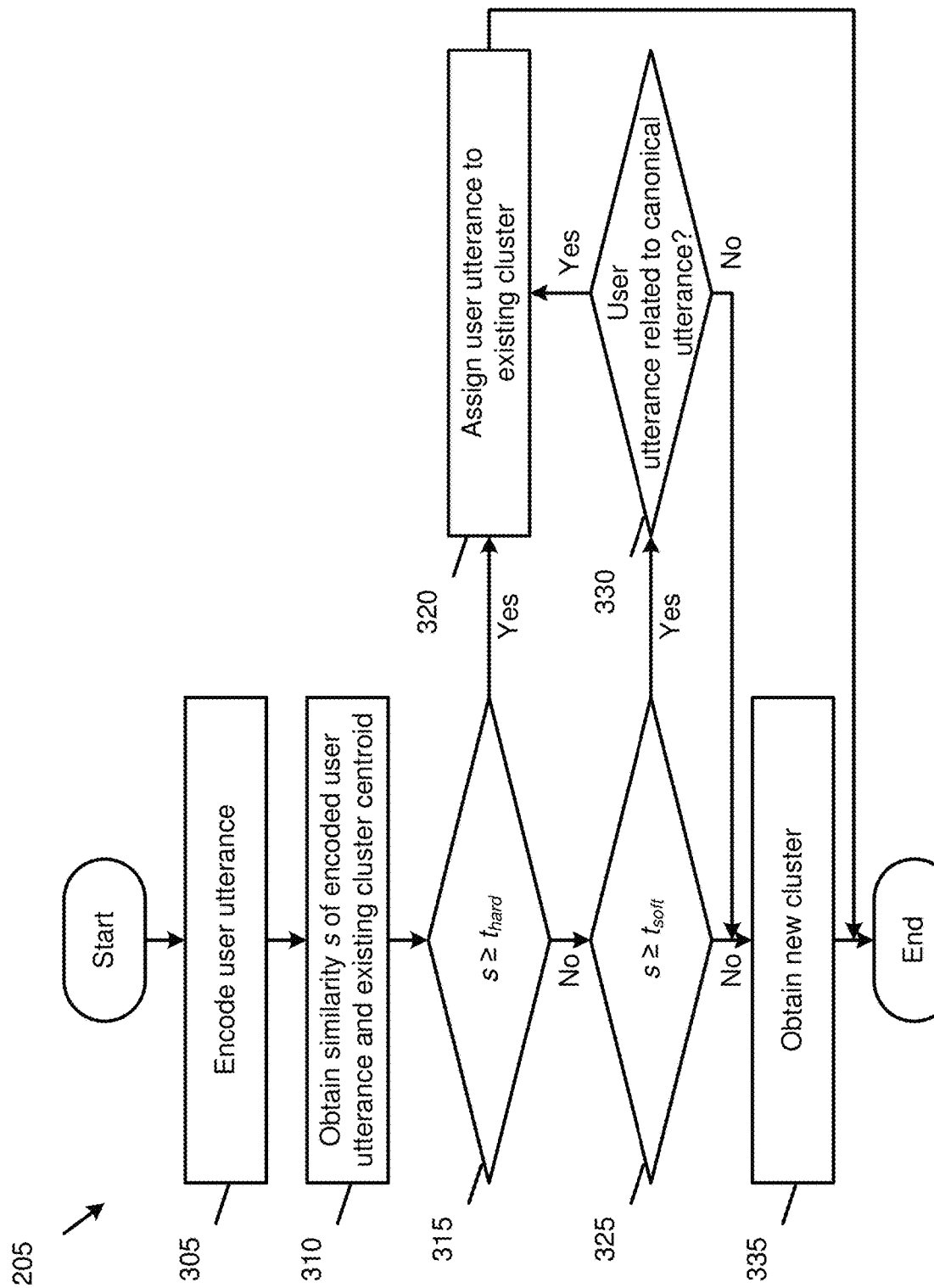
FIG. 3A is a flowchart of an operation of determining whether a user utterance of a user refers to a new automation script, as shown in FIG. 2.

FIG. 3A is a flowchart of the operation 205 of determining whether a user utterance of a user refers to a new automation script, as shown in FIG. 2.

Referring to FIG. 3A, the operation 205 may be performed by the apparatus 100 of FIG. 1, namely, the utterance clustering module 105.

In operation 305, the operation 205 includes encoding a user utterance. The user utterance may be encoded using a pre-trained Universal Sentence Encoder into a vector embedding. The Universal Sentence Encoder has similar representations for semantically similar sentences.

In operation 310, the operation 205 obtains a similarity s between the encoded user utterance (the vector embedding) and an existing cluster centroid of an existing cluster. The similarity s may be obtained using angular cosine similarity between the encoded user utterance and the existing cluster centroid. The existing cluster centroid refers to a mean of vector embeddings of all utterances in the existing cluster.

In operation 315, the operation 205 includes determining whether the obtained similarity s is greater than or equal to a hard threshold $t_{hard}$. Based on the similarity s being determined to be greater than or equal to the hard threshold $t_{hard}$, the operation 205 continues in operation 320. Otherwise, the operation 205 continues in operation 325.

In the operation 320, the operation 205 includes assigning the user utterance to the existing cluster, and determining that the user utterance refers to an existing automation script corresponding to the existing cluster.

In the operation 325, the operation 205 includes determining whether the obtained similarity s is greater than or equal to a soft threshold $t_{soft}$. Based on the similarity s being determined to be greater than or equal to the soft threshold $t_{soft}$, the operation 205 continues in operation 330. Otherwise, the operation 205 continues in operation 335.

In the operation 330, the operation 205 includes inquiring the user to verify whether the user utterance relates to (is the same or similar to) a task of a canonical utterance of the existing cluster. For example, for the user utterance "Find nearest Chinese restaurants," the user may be asked, "Did you mean a task similar to: 'Get me the closest Italian restaurants'?" Based on the user utterance being verified to relate to the task of the canonical utterance, the operation 205 continues in the operation 320. Otherwise, the operation 205 continues in the operation 335.

In the operation 335, the operation 205 includes obtaining a new cluster, assigning the user utterance to the existing cluster as the canonical cluster of the existing cluster, and determining that the user utterance refers to a new automation script corresponding to the obtained new cluster.

Figure 3B:
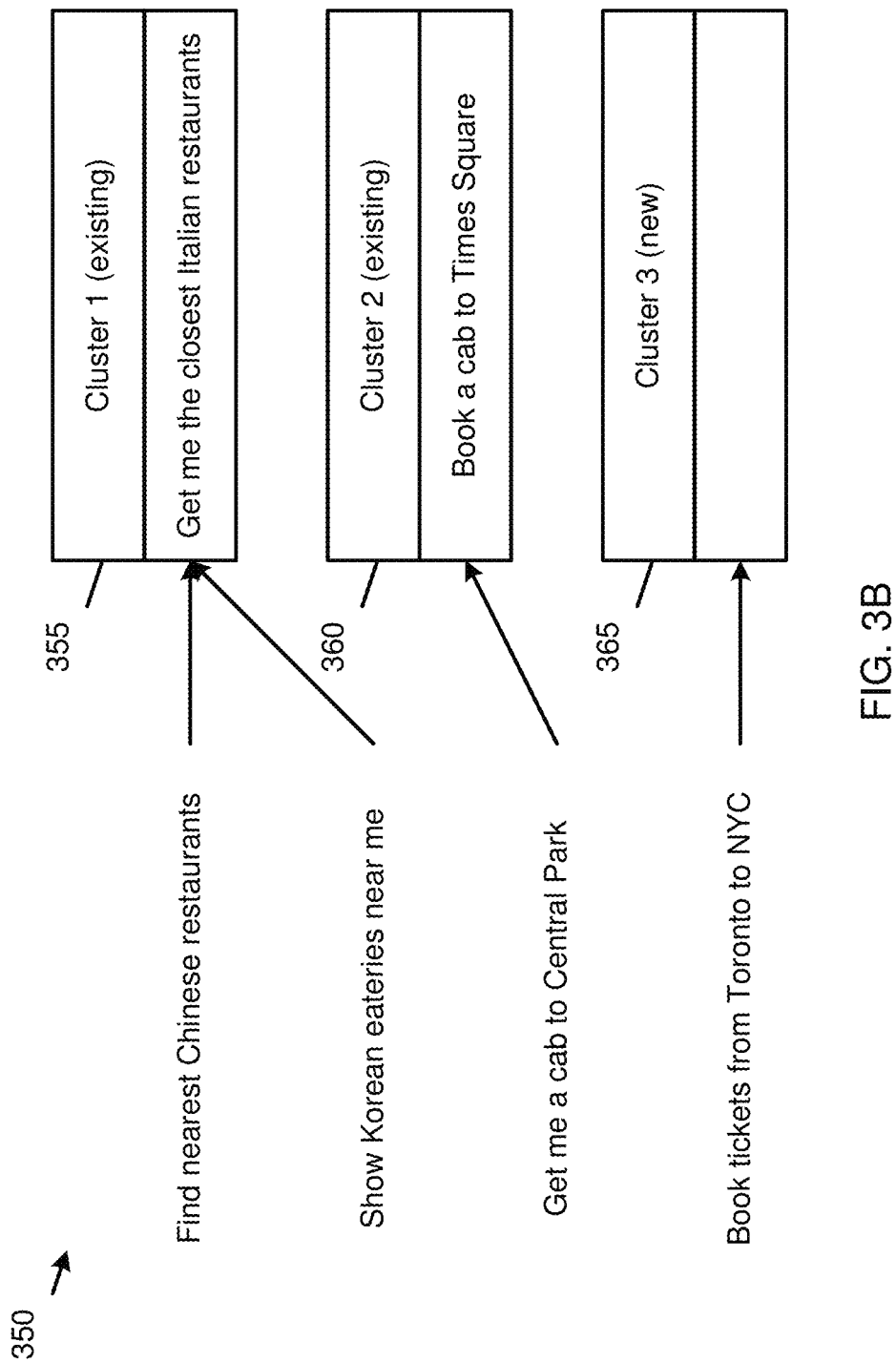
FIG. 3B is a diagram illustrating user utterances being respectively assigned to clusters, according to embodiments.

FIG. 3B is a diagram illustrating user utterances being respectively assigned to clusters, according to embodiments.

As shown in FIG. 3B, user utterances 350 may be respectively assigned to cluster 1 355, cluster 2 360 and cluster 3 365, using the operation 205 described in FIG. 3A. Cluster 1 355 and cluster 2 360 are existing clusters of similar user utterances, and cluster 3 365 is a new cluster of similar user utterances to which an utterance "Book tickets from Toronto to NYC" is added.

Figure 4A:
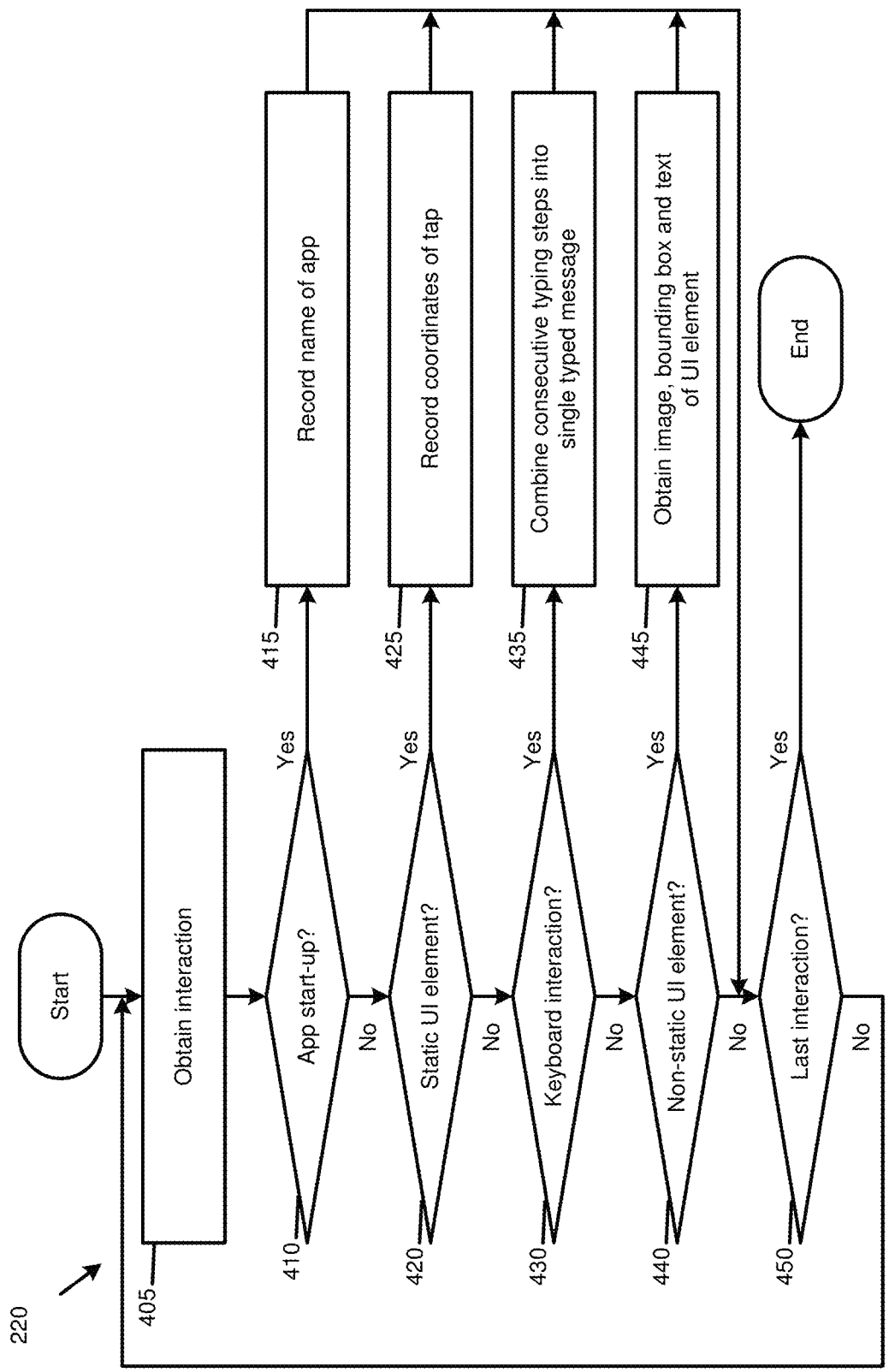
FIG. 4A is a flowchart of an operation of learning a new automation script, based on recorded user interactions, as shown in FIG. 2.

FIG. 4A is a flowchart of the operation 220 of learning a new automation script, based on recorded user interactions, as shown in FIG. 2.

Referring to FIG. 4A, the operation 220 may be performed by the apparatus 100 of FIG. 1, namely, the learning module 115.

In operation 405, the operation 220 includes obtaining an interaction of a user from user interactions that are recorded by the demonstration module 110.

In operation 410, the operation 220 includes determining whether the obtained interaction is an application start-up event, i.e., a touch of an application start-up button. Based on the obtained interaction being determined to be the application start-up event, the operation 220 continues in operation 415. Otherwise, the operation 220 continues in operation 420.

In the operation 415, the operation 220 includes recording, in a new automation script, a name of an application that was launched due to the application start-up event.

In the operation 420, the operation 220 includes determining whether the obtained interaction is a tap on a static UI element. Based on the obtained interaction being determined to be the tap on the static UI element, the operation 220 continues in operation 425. Otherwise, the operation 220 continues in operation 430.

In the operation 425, the operation 220 includes recording, in the new automation script, (x,y)-coordinates of the tap on the static UI element.

In the operation 430, the operation 220 includes determining whether the obtained interaction is a keyboard interaction, i.e., a press of a key on a keyboard. Based on the obtained interaction being determined to be the keyboard interaction, the operation 220 continues in operation 435. Otherwise, the operation 220 continues in operation 440.

In the operation 435, the operation 220 includes combining all consecutive typing steps of the keyboard interaction into one step including a single typed message, and recording the single typed message in the new automation script.

In the operation 440, the operation 220 includes determining whether the obtained interaction is an interaction with a non-static UI element. Based on the obtained interaction being determined to be the interaction with the non-static UI element, the operation 220 continues in operation 445. Otherwise, the operation 220 continues in operation 450.

In the operation 445, the operation 220 includes obtaining an image and a bounding box of the non-static UI element, using the object detection neural network, and obtaining textual information in pixels of the obtained bounding box of the non-static UI element, using the OCR neural network. The operation 220 then includes recording the obtained interaction with the non-static UI element, bounding box and textual information in the new automation script, as references to find the same non-static UI element on a screen during execution of the new automation script.

In the operation 450, the operation 220 includes determining whether the obtained interaction is a last interaction among the recorded user interactions. Based on the obtained interaction being determined to be the last interaction, the operation 220 ends. Otherwise, the operation 220 returns to the operation 405 to iterate through the recorded user interactions.

Figure 4B:
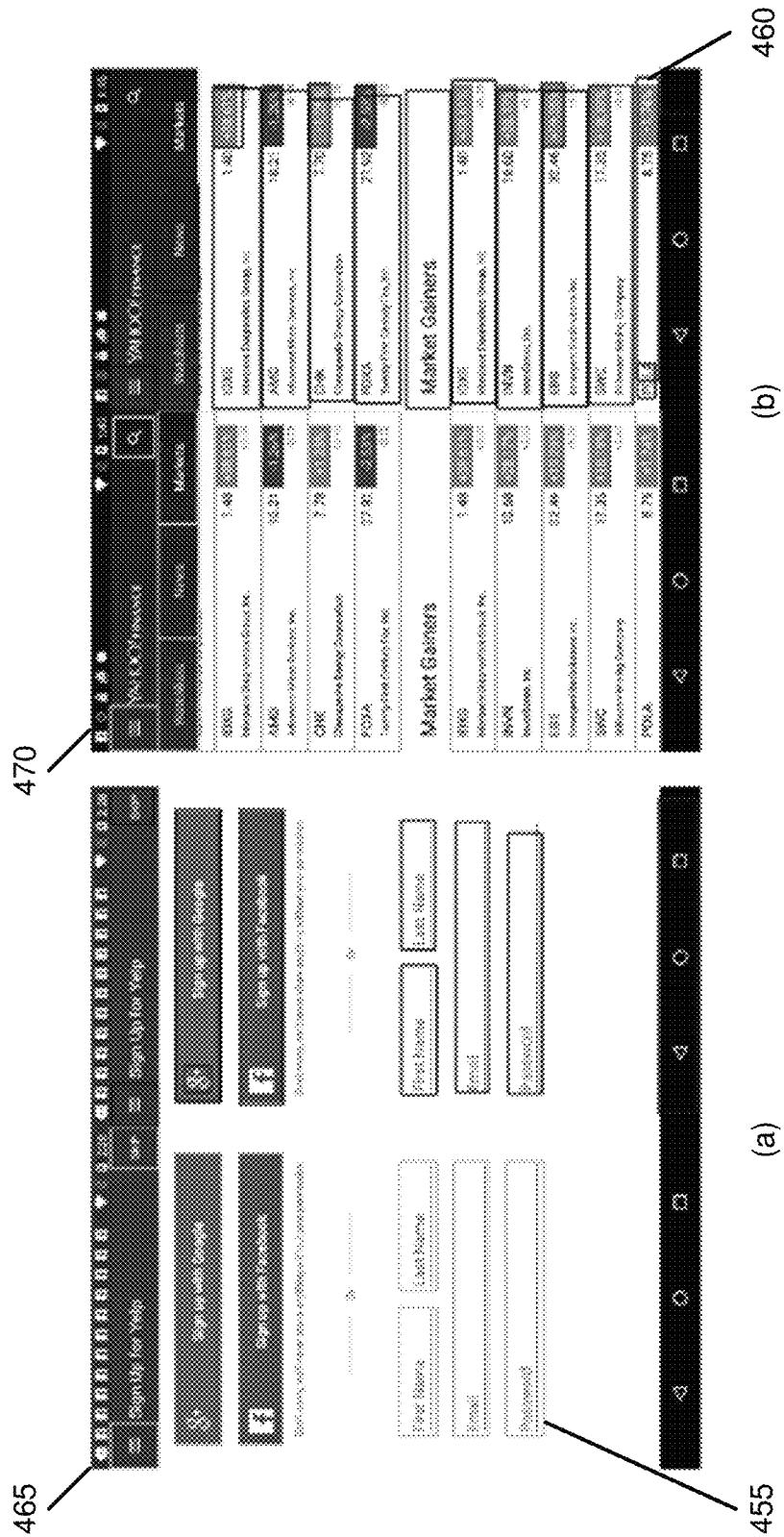
FIG. 4B is a diagram illustrating bounding boxes of user interface (UI) elements that a user interacted with being recognized, according to embodiments.

FIG. 4B is a diagram illustrating bounding boxes of UI elements that a user interacted with being recognized, according to embodiments.

As discussed above, an object detection neural network that is used to learn and execute an automation script may include a pre-trained CNN or RPN such as RetinaNet. The object detection neural network may be trained using the RICO dataset consisting a large dataset of UI screens across various smartphone applications. Each UI screen has its own detailed view hierarchy containing local accessibility service information about every UI element within the UI screen.

Referring to FIG. 4B, the trained object detection neural network may recognize bounding boxes 455 and 460 respectively of UI elements in UI screens 465 and 470 of smartphone applications in the RICO dataset. The recognized bounding boxes 455 and 460 are recorded in a new automation script.

Figure 5:
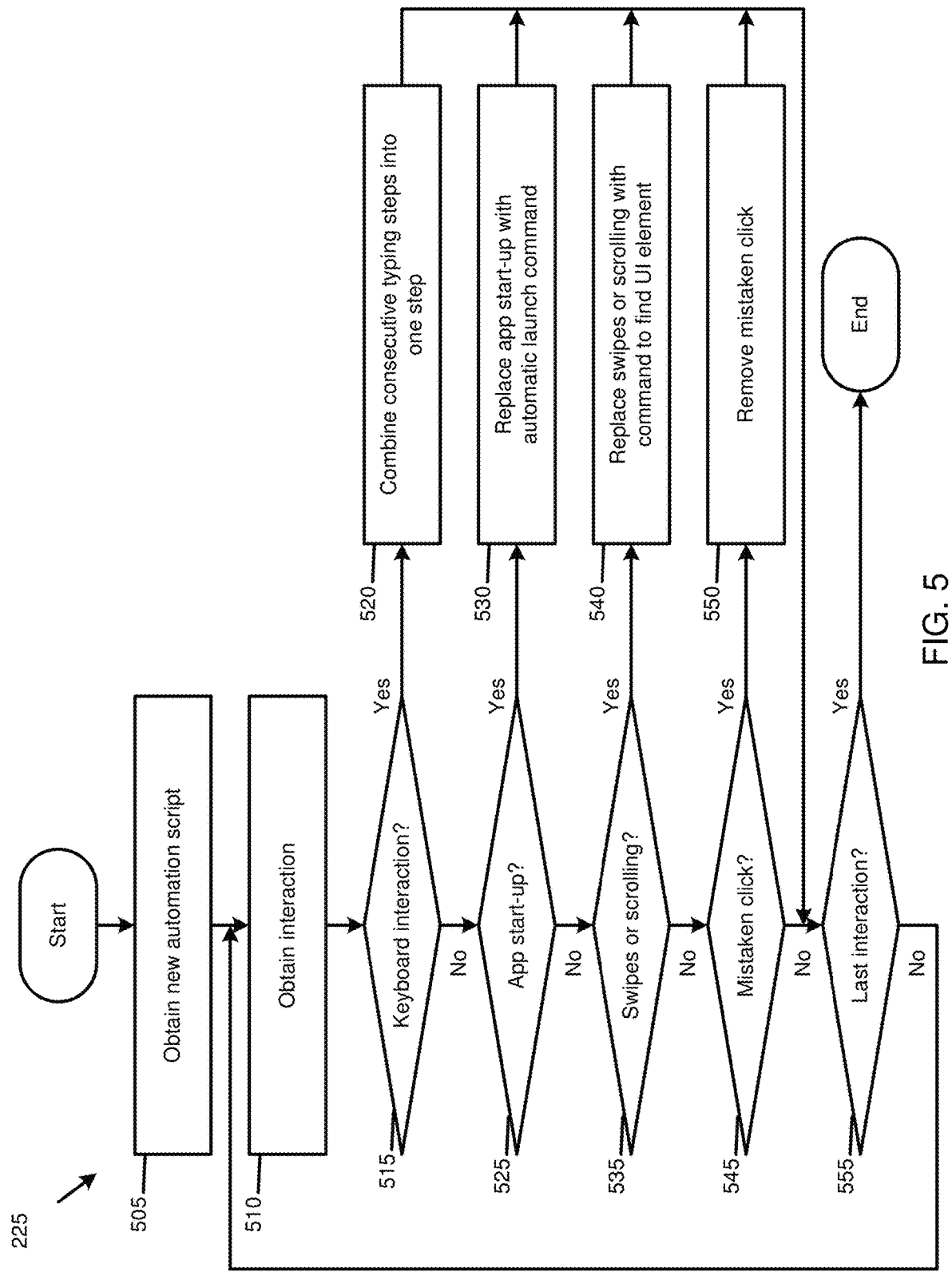
FIG. 5 is a flowchart of an operation of filtering at least one unnecessary action from the new automation script, based on the recorded user interactions, to obtain a refined automation script, as shown in FIG. 2.

FIG. 5 is a flowchart of the operation 225 of filtering at least one unnecessary action from a new automation script, based on recorded user interactions, to obtain a refined automation script, as shown in FIG. 2.

Referring to FIG. 5, the operation 225 may be performed by the apparatus 100 of FIG. 1, namely, the automation script refinement module 120.

In operation 505, the operation 225 includes obtaining a new automation script from the learning module 115.

In operation 510, the operation 225 includes obtaining an interaction of a user from tasks or user interactions that are recorded in the new automation script by the learning module 115.

In operation 515, the operation 225 includes determining whether the obtained interaction is a keyboard interaction. Based on the obtained interaction being determined to be the keyboard interaction, the operation 225 continues in operation 520. Otherwise, the operation 225 continues in operation 525.

In the operation 520, the operation 225 includes combining, in the new automation script, all consecutive typing steps of the keyboard interaction into one step, e.g., including a single typed message. The operation 225 further includes removing, from the new automation script, unnecessary actions during typing, including, e.g., backspaces, capitalizations of letters and fixing typos.

For example, the operation 225 may include determining what keys are pressed by the user, by comparing tap coordinates with locations of they keys and in what order, and combining the determined keys into a single text command for execution. In a use case, in the existing automation script, if the user typed "shift", "c", "a", "t", in order, the text "Cat" may directly replace these keys, thus speeding up task execution. The same thing may happen when the user has a typo in a text and then fixes it. The input key may be detected using template matching, allowing the operation 225 to be agnostic of hardware-specific details.

In another example, the operation 225 may include combining, in the new automation script, serial user inputs that can be performed simultaneously, into a single user input that is performed at one time. For example, a first user input may include sending a text message to a first person, and a second user input serially after the first user input may include sending the same text message to a second person different from the first person. The first and second user input may be combined into a single user input in the new automation script, namely, a group message that is sent simultaneously to both the first and second persons.

In the operation 525, the operation 225 includes determining whether the obtained interaction is an application start-up event. Based on the obtained interaction being determined to be the application start-up event, the operation 225 continues in operation 530. Otherwise, the operation 225 continues in operation 535.

In the operation 530, the operation 225 includes replacing, in the new automation script, one or more manual application start-up inputs with an automatic launch command of an application corresponding to the application start-up event. The manual application start-up inputs may include unnecessary steps of finding the application, including, e.g., swiping left or right and opening a folder where the application is saved. In a use case, in the existing automation script, if the user taps on the "Settings" application, an automatic launch command for the "Settings" application may directly replace the tap on the "Settings" application. The automatic launch command being more consistent and faster during an execution phase because possible positional and visual changes to a button of the "Settings" application do not have to be searched for, and unnecessary steps (e.g., swiping left or right, opening a folder where the application is saved, and extracting visual and language information) of finding the button do not have to be replicated.

In the operation 535, the operation 225 includes determining whether the obtained interaction includes multiple swipes or scrolling to search for a UI element. Based on the obtained interaction being determined to include the multiple swipes or scrolling, the operation 225 continues in operation 540. Otherwise, the operation 225 continues in operation 545.

In the operation 540, the operation 225 includes replacing, in the new automation script, the multiple swipes or scrolling with a command to find the UI element. This command may be simplified in comparison to the multiple swipes or scrolling, and may include searching for the UI element in a current page, then scrolling or swiping once in a predetermined direction and searching again for the UI element, and continuing this process until the UI element is found. The predetermined direction may be determined based on a sum of durations of swipes during a demonstration phase.

In the operation 545, the operation 225 includes determining whether the obtained interaction includes a mistaken click. The mistaken click may occur, e.g., when the user receives an incoming call or a notification from an irrelevant application and mistakenly clicks on the incoming call or notification during a demonstration phase. The notification may be, for example, a text message irrelevant from a demonstration during the demonstration phase. The mistaken click may take the user to a different page and force the user to click on a back button of a smartphone to go back to an original page without interacting with any UI element in the different page or with just scrolling the different page. Based on the obtained interaction being determined to include the mistaken click, the operation 225 continues in operation 550. Otherwise, the operation 225 continues in operation 555.

In the operation 550, the operation 225 includes removing, from the new automation script, the mistaken click and possibly all steps after the mistaken click and before returning to an original page in which the mistaken click occurs. For example, the operation 225 may include detecting a click on a back button and determining whether any of steps occurring between the mistaken click and the click on the back button is unnecessary. The operation 225 may further include, based on one or more of the steps between the mistaken click and the click on the back button being determined to be unnecessary, labeling the one or more of the steps as potential errors and unnecessary actions, and then removing the one or more of the steps labeled as potential errors and unnecessary actions. The click on the back button may be detected using an image classifier for semantic labeling of UI elements such as the back button and a send button, regardless of whether the back button is of a smartphone (system-level) or is inside an application (application-level).

In another example, the operation 225 may include detecting the mistaken click and all steps after the mistaken click and before returning to the original page in which the mistake click occurs, and labeling these steps as potential errors and unnecessary actions. The operation 225 may further include removing the steps labeled as potential errors and unnecessary actions.

In still another example, the mistaken click and the steps labeled as potential errors and unnecessary actions may seem unnecessary, but the user may want them to be in the new automation script. Thus, the operation 225 may include estimating an execution time with and without the mistaken click and the labeled steps, and inquiring the user to verify whether each of the mistaken click and the labeled steps can be removed from the new automation script. The operation 225 may further include, based on one or more of the mistaken click and the labeled steps being verified by the user to be removed, removing the one or more of mistaken click and the labeled steps from the new automation script.

The mistaken click and the labeled steps may be displayed to the user, along with the estimated execution time with and without the mistaken click and the labeled steps, and the user may select or manually verify which of the mistaken click and the labeled steps is to be removed from the new automation script.

In the operation 555, the operation 225 includes determining whether the obtained interaction is a last interaction among the recorded tasks or user interactions. Based on the obtained interaction being determined to be the last interaction, the operation 225 ends. Otherwise, the operation 225 returns to the operation 510 to iterate through the recorded tasks or user interactions.

Figure 6:
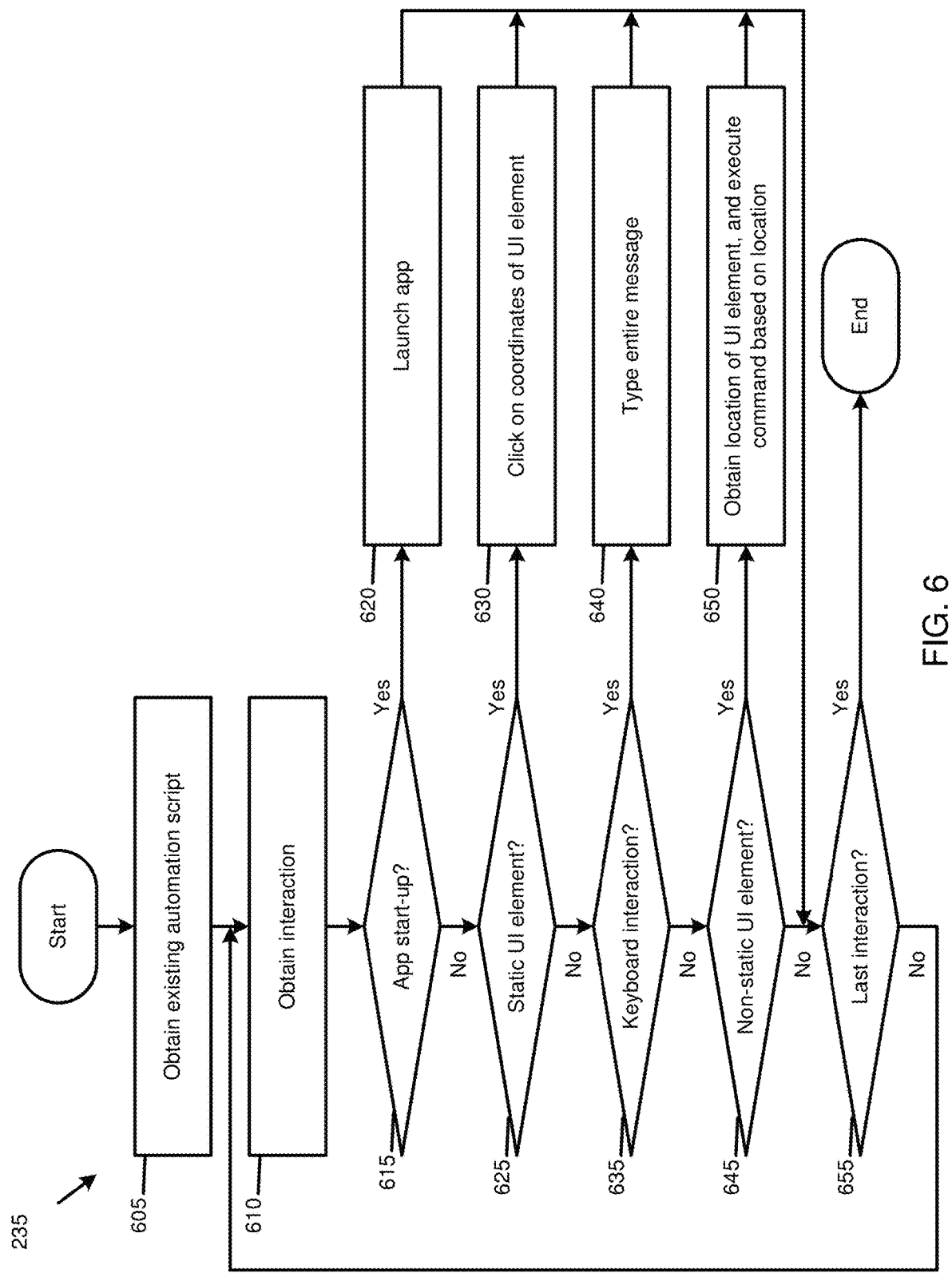
FIG. 6 is a flowchart of an operation of executing an existing automation script, as shown in FIG. 2.

FIG. 6 is a flowchart of the operation 235 of executing an existing automation script, as shown in FIG. 2.

Referring to FIG. 6, the operation 235 may be performed by the apparatus 100 of FIG. 1, namely, the execution module 130.

In operation 605, the operation 235 includes obtaining an existing automation script that may be updated by the parameter prediction module 125.

In operation 610, the operation 235 includes obtaining an interaction of a user from tasks or user interactions that are recorded in the existing automation script by the learning module 115.

In operation 615, the operation 235 includes determining whether the obtained interaction is an application start-up event. Based on the obtained interaction being determined to be the application start-up event, the operation 235 continues in operation 620. Otherwise, the operation 235 continues in operation 625.

In the operation 620, the operation 235 includes launching an application corresponding to the application start-up event, based on a name of the application that is recorded in the existing automation script by the learning module 115.

In the operation 625, the operation 235 includes determining whether the obtained interaction is a tap on a static UI element. Based on the obtained interaction being determined to be the tap on the static UI element, the operation 235 continues in operation 630. Otherwise, the operation 235 continues in operation 635.

In the operation 630, the operation 235 includes clicking on (x,y)-coordinates of the static UI element that is recorded in the existing automation script by the learning module 115.

In the operation 635, the operation 235 includes determining whether the obtained interaction is a keyboard interaction. Based on the obtained interaction being determined to be the keyboard interaction, the operation 235 continues in operation 640. Otherwise, the operation 235 continues in operation 645.

In the operation 640, the operation 235 includes typing an entire message that is typed by the user in a demonstration phase and recorded in the existing automation script by the learning module 115 in a learning phase.

In the operation 645, the operation 235 includes determining whether the obtained interaction is an interaction with a non-static UI element. Based on the obtained interaction being determined to be the interaction with the non-static UI element, the operation 235 continues in operation 650. Otherwise, the operation 235 continues in operation 655.

In the operation 650, the operation 235 includes obtaining a location of the non-static UI element, and executing a command based on the obtained location. In detail, the operation 235 includes capturing a screenshot of an electronic device and searching for the non-static UI element at a location of the captured screenshot that is the same as that of (x,y)-coordinates of a bounding box of the non-static UI element that is recorded by the learning module 115 during a learning phase. The searching includes performing template matching between an image of the non-static UI element that is recorded by the learning module 115 during the learning phase and the above-described location of the captured screenshot. Based on the non-static UI element being found in the above-described location of the captured screenshot, an ADB command related to the non-static UI element in the existing automation script is executed without change.

Based on the non-static UI element not being found in the above-described location of the captured screenshot, the operation 235 may include performing template matching between the image of the non-static UI element and all possible locations in the captured screenshot. The template matching may include using a sliding window approach to compare the image of the non-static UI element (a template image) across the larger captured screenshot and calculate a score at every sliding position. Hence, the location of the non-static UI element may be found even if this location shifts. Based on the non-static UI element being found in a new location among the possible locations in the captured screenshot, the ADB command related to the non-static UI element in the existing automation script is executed at the new location.

Based on the non-static UI element not being found in the possible locations in the captured screenshot (e.g., because the non-static UI element undergoes a visual change due to application updates), the operation 235 may include finding all UI elements in the captured screenshot, and recognize textual information of the found UI elements. The operation 235 may further include comparing the textual information of each of the found UI elements with textual information of the non-static UI element that is recorded in the existing automation script by the learning module 115 during the learning phase, using a Levenshtein distance score. The Levenshtein distance score may be a string metric for measuring a difference between two sequences. The operation 235 may further including ranking the Levenshtein distance score between the textual information of the non-static UI element and the textual information of each of the found UI elements, and returning a location top matching UI element among the found UI elements, as the location of the non-static UI element, if a corresponding score is lower than a predetermined threshold.

Based on the non-static UI element being found using the textual information of the non-static UI element, the ADB command related to the non-static UI element in the existing automation script is executed at the new location. For a tap or a long tap, the user input is executed without change at the new location. For a swipe that is followed by the interaction with the non-static UI element, the swipe is ignored.

Based on the non-static UI element not being found using the textual information of the non-static UI element, the operation 235 may include swiping a screen in the same direction as demonstrated by the user and again searching for the non-static UI element in a new screen. This process may continue until the non-static UI element is found, ensuring that the non-static UI element may be found even if it is moved in a list of UI elements after the demonstration phase. However, based on non-static UI element not being found after the above-described process is completed, the operation 235 may continue to the operation 655, as the execution module 130 does not have any more information to locate the non-static UI element.

In the operation 655, the operation 235 includes determining whether the obtained interaction is a last interaction among the recorded tasks or user interactions. Based on the obtained interaction being determined to be the last interaction, the operation 235 ends. Otherwise, the operation 235 returns to the operation 610 to iterate through the recorded tasks or user interactions. The operation 235 may further include waiting for a screen to settle before returning to the operation 610.

Figure 7:
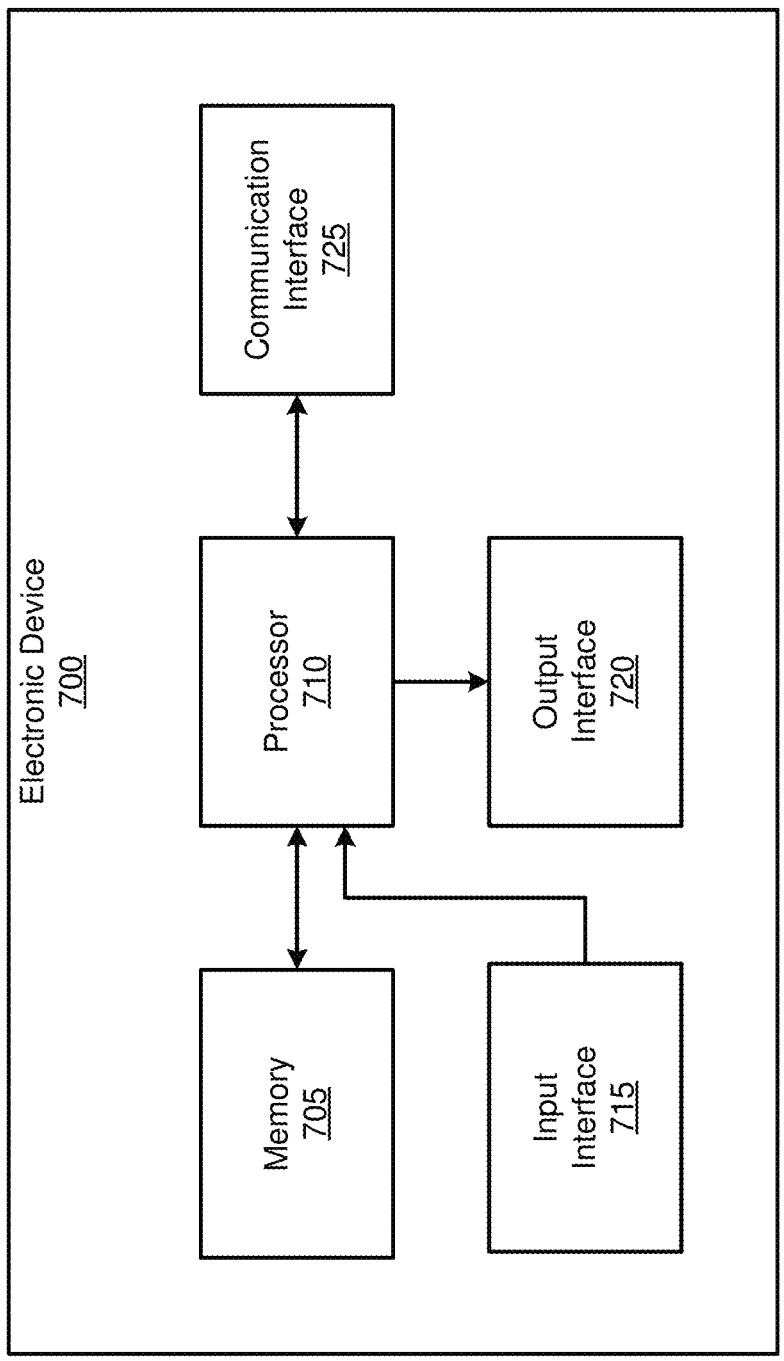
FIG. 7 is a block diagram of an electronic device, according to embodiments.

FIG. 7 is a block diagram of an electronic device 700, according to embodiments.

Referring to FIG. 7, the electronic device 700 includes a memory 705, a processor 710, an input interface 715 and an output interface 720. The electronic device 700 may be implemented in the apparatus 100 of FIG. 1.

The processor 710 takes overall control of the electronic device 700. The processor 710 executes one or more programs stored in the memory 705.

The memory 705 stores various data, programs, or applications for driving and controlling the electronic device 700. A program stored in the memory 705 includes one or more instructions. A program (one or more instructions) or an application stored in the memory 705 may be executed by the processor 710.

The processor 710 may perform any one or any combination of operations of the apparatus 100 shown in FIGS. 1-6 and have been described with reference to FIGS. 1-6.

The input interface 715 may receive a user input and/or a data such as a state of an agent. The input interface 715 may include, for example, a touchscreen, a camera, a microphone, a keyboard, a mouse or any combination thereof.

The output interface 720 may obtain data from, e.g., the processor 710, and may output the obtained data. The output interface 720 may include, for example, a touchscreen, a television, a computer monitor, a speaker or any combination thereof.

The block diagram of the electronic device 700 is provided as an example. Each component in the block diagram may be integrated, added, or omitted depending upon specifications of the electronic device 700 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN or CNN described above may be implemented via a software module. When the DNN or CNN model is implemented via a software module (for example, a program module including instructions), the DNN or CNN model may be stored in a computer-readable recording medium.

Also, the DNN or CNN model may be a part of the apparatus 100 described above by being integrated in a form of a hardware chip. For example, the DNN or CNN model may be manufactured in a form of a dedicated hardware chip for AI, or may be manufactured as a part of an existing general-purpose processor (for example, CPU or application processor) or a graphic-dedicated processor (for example GPU).

Also, the DNN or CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for vision and language-assisted smartphone task automation, the apparatus comprising:
a memory storing instructions; and
a processor configured to execute the instructions to:
identify whether an utterance of a user refers to one among at least one existing automation script;
in response to the utterance being identified to not refer to the one among the at least one existing automation script:
capture a last frame of a video that is recorded prior to a user interaction on a screen that is currently displayed on a display, and one or more coordinates of the screen currently displayed on the display, the last frame and the one or more coordinates corresponding to one or more interactions of the user with the screen currently displayed on the display while the user is demonstrating a new automation script;
perform object detection and optical character recognition on the captured last frame and the captured one or more coordinates to obtain user interface (UI) elements corresponding to the one or more interactions; and
obtain the new automation script, based on the obtained UI elements, the new automation script being included among the at least one existing automation script; and
based on the utterance being identified to refer to the one among the at least one existing automation script:
identify whether the utterance comprises a new parameter different from an existing parameter included in the one among the at least one existing automation script;
based on the utterance being identified to not comprise the new parameter, perform the one among the at least one existing automation script; and
based on the utterance being identified to comprise the new parameter:
update the one among the at least one existing automation script, based on the new parameter; and perform the one among the at least one existing automation script.

2. The apparatus of claim 1, wherein the processor is further configured to execute the instructions to:
obtain, from the obtained new automation script, one or more keyboard inputs;
remove unnecessary ones of the one or more keyboard inputs and combine remaining ones of the one or more keyboard inputs, to obtain a single text instruction; and
replace the one or more keyboard inputs included in the obtained new automation script, with the obtained single text instruction, to refine the new automation script, the refined new automation script being included among the at least one existing automation script.

3. The apparatus of claim 1, wherein the processor is further configured to execute the instructions to:
encode the utterance, using a Universal Sentence Encoder;
obtain a similarity between the encoded utterance and a centroid of a cluster of utterances;
identify whether the similarity is greater than or equal to a predetermined threshold;
based on the similarity being identified to be greater than or equal to the predetermined threshold, identify that the utterance refers to the one among the at least one existing automation script; and
based on the similarity being identified to be less than the predetermined threshold, identify that the utterance does not refer to the one among the at least one existing automation script.

4. The apparatus of claim 1, wherein the processor is further configured to execute the instructions to:
identify whether one among the obtained UI elements is one among an application start-up button, a keyboard, a static UI element and a non-static UI element;
based on the one among the obtained UI elements being identified to be the application start-up button, record, in the new automation script, a name of an application corresponding to the application start-up button;
based on the one among the obtained UI elements being identified to be the keyboard, combine consecutive typing steps into a typed message, and record the typed message in the new automation script;
based on the one among the obtained UI elements being identified to be the static UI element, record, in the new automation script, coordinates of a first input on the static UI element; and
based on the one among the obtained UI elements being identified to be the non-static UI element, obtain an image of the non-static UI element, perform the object detection on a respective one of the captured last frame to obtain a bounding box of the non-static UI element, and perform the optical character recognition on the respective one of the captured last frame to obtain a text on the non-static UI element.

5. The apparatus of claim 4, wherein the processor is further configured to execute the instructions to:
identify whether a task included in the existing automation script is one among an application start-up event, a keyboard interaction, the first input on the static UI element and a second input on the non-static UI element;
based on the task being identified to be the application start-up event, launch the application based on the recorded name of the application;
based on the task being identified to be the keyboard interaction, type the recorded typed message;
based on the task being identified to be the first input on the static UI element, perform the first input on the recorded coordinates of the first input on the static UI element; and
based on the task being identified to be the second input on the non-static UI element, obtain a location of the non-static UI element, based on the obtained image of the non-static UI element, the obtained bounding box of the non-static UI element, and the obtained text on the non-static UI element, and perform the second input on the obtained location of the non-static UI element.

6. The apparatus of claim 1, wherein the processor is further configured to execute the instructions to:
identify whether a task included in the new automation script corresponds to one among an application start-up event, multiple swipes or scrolling and a mistaken click;
based on the task being identified to correspond to the application start-up event, replace, in the new automation script, one or more manual application start-up inputs corresponding to the application start-up event, with an automatic launch command for an application corresponding to the application start-up event;
based on the task being identified to correspond to the multiple swipes or scrolling, replace, in the new automation script, the multiple swipes or scrolling, with a command to find one among the obtained UI elements; and
based on the task being identified to correspond to the mistaken click, remove, from the new automation script, the mistaken click.

7. A method of vision and language-assisted smartphone task automation, the method comprising:
identifying whether an utterance of a user refers to one among at least one existing automation script;
in response to the utterance being identified to not refer to the one among the at least one existing automation script:
capturing a last frame of a video that is recorded prior to a user interaction on a screen that is currently displayed on a display, and one or more coordinates of the screen currently displayed on the display, the last frame and the one or more coordinates corresponding to one or more interactions of the user with the screen currently displayed on the display while the user is demonstrating a new automation script;
performing object detection and optical character recognition on the captured last frame and the captured one or more coordinates to obtain user interface (UI) elements corresponding to the one or more interactions; and
obtaining the new automation script, based on the obtained UI elements, the new automation script being included among the at least one existing automation script; and
based on the utterance being identified to refer to the one among the at least one existing automation script:
identifying whether the utterance comprises a new parameter different from an existing parameter included in the one among the at least one existing automation script;
based on the utterance being identified to not comprise the new parameter, performing the one among the at least one existing automation script; and
based on the utterance being identified to comprise the new parameter:
updating the one among the at least one existing automation script, based on the new parameter; and performing the updated one among the at least one existing automation script.

8. The method of claim 7, further comprising:
obtaining, from the obtained new automation script, one or more keyboard inputs;
removing unnecessary ones of the one or more keyboard inputs and combine remaining ones of the one or more keyboard inputs, to obtain a single text instruction; and
replacing the one or more keyboard inputs included in the obtained new automation script, with the obtained single text instruction, to refine the new automation script, the refined new automation script being included among the at least one existing automation script.

9. The method of claim 7, wherein the identifying whether the utterance refers to the one among the at least one existing automation script comprises:
encoding the utterance, using a Universal Sentence Encoder;
obtaining a similarity between the encoded utterance and a centroid of a cluster of utterances;
identifying whether the similarity is greater than or equal to a predetermined threshold;
based on the similarity being identified to be greater than or equal to the predetermined threshold, identifying that the utterance refers to the one among the at least one existing automation script; and
based on the similarity being identified to be less than the predetermined threshold, identifying that the utterance does not refer to the one among the at least one existing automation script.

10. The method of claim 7, wherein the obtaining the new automation script comprises:
identifying whether one among the obtained UI elements is one among an application start-up button, a keyboard, a static UI element and a non-static UI element;
based on the one among the obtained UI elements being identified to be the application start-up button, recording, in the new automation script, a name of an application corresponding to the application start-up button;
based on the one among the obtained UI elements being identified to be the keyboard, combining consecutive typing steps into a typed message, and record the typed message in the new automation script;
based on the one among the obtained UI elements being identified to be the static UI element, recording, in the new automation script, coordinates of a first input on the static UI element; and
based on the one among the obtained UI elements being identified to be the non-static UI element, obtaining an image of the non-static UI element, performing the object detection on a respective one of the captured last frame to obtain a bounding box of the non-static UI element, and performing the optical character recognition on the respective one of the captured last frame to obtain a text on the non-static UI element.

11. The method of claim 10, wherein the performing the one among the at least one existing automation script comprises:
identifying whether a task included in the existing automation script is one among an application start-up event, a keyboard interaction, the first input on the static UI element and a second input on the non-static UI element;
based on the task being identified to be the application start-up event, launching the application based on the recorded name of the application;
based on the task being identified to be the keyboard interaction, typing the recorded typed message;
based on the task being identified to be the first input on the static UI element, performing the first input on the recorded coordinates of the first input on the static UI element; and
based on the task being identified to be the second input on the non-static UI element, obtaining a location of the non-static UI element, based on the obtained image of the non-static UI element, the obtained bounding box of the non-static UI element, and the obtained text on the non-static UI element, and performing the second input on the obtained location of the non-static UI element.

12. The method of claim 7, further comprising:
identifying whether a task included in the new automation script corresponds to one among an application start-up event, multiple swipes or scrolling and a mistaken click;
based on the task being identified to correspond to the application start-up event, replacing, in the new automation script, one or more manual application start-up inputs corresponding to the application start-up event, with an automatic launch command for an application corresponding to the application start-up event;
based on the task being identified to correspond to the multiple swipes or scrolling, replacing, in the new automation script, the multiple swipes or scrolling, with a command to find one among the obtained UI elements; and
based on the task being identified to correspond to the mistaken click, removing, from the new automation script, the mistaken click.

13. A non-transitory computer-readable storage medium storing instructions to cause a processor to:
identify whether an utterance of a user refers to one among at least one existing automation script;
in response to the utterance being identified to not refer to the one among the at least one existing automation script:
capture a last frame of a video that is recorded prior to a user interaction on a screen that is currently displayed on a display, and one or more coordinates of the screen currently displayed on the display, the last frame and the one or more coordinates corresponding to one or more interactions of the user with the screen currently displayed on the display while the user is demonstrating a new automation script;
perform object detection and optical character recognition on the captured last frame and the captured one or more coordinates to obtain user interface (UI) elements corresponding to the one or more interactions; and
obtain the new automation script, based on the obtained UI elements, the new automation script being included among the at least one existing automation script; and
based on the utterance being identified to refer to the one among the at least one existing automation script:
identify whether the utterance comprises a new parameter different from an existing parameter included in the one among the at least one existing automation script;
based on the utterance being identified to not comprise the new parameter, perform the one among the at least one existing automation script; and
based on the utterance being identified to comprise the new parameter:
update the one among the at least one existing automation script, based on the new parameter; and perform the update one among the at least one existing automation script.

14. The non-transitory computer-readable storage medium of claim 13, wherein the instructions further cause the processor to:
   obtain, from the obtained new automation script, one or more keyboard inputs;
   remove unnecessary ones of the one or more keyboard inputs and combine remaining ones of the one or more keyboard inputs, to obtain a single text instruction; and
   replace the one or more keyboard inputs included in the obtained new automation script, with the obtained single text instruction, to refine the new automation script, the refined new automation script being included among the at least one existing automation script.

15. The non-transitory computer-readable storage medium of claim 13, wherein the instructions further cause the processor to:
   encode the utterance, using a Universal Sentence Encoder;
   obtain a similarity between the encoded utterance and a centroid of a cluster of utterances;
   identify whether the similarity is greater than or equal to a predetermined threshold;
   based on the similarity being identified to be greater than or equal to the predetermined threshold, identify that the utterance refers to the one among the at least one existing automation script; and
   based on the similarity being identified to be less than the predetermined threshold, identify that the utterance does not refer to the one among the at least one existing automation script.

16. The non-transitory computer-readable storage medium of claim 13, wherein the instructions further cause the processor to:
   identify whether one among the obtained UI elements is one among an application start-up button, a keyboard, a static UI element and a non-static UI element;
   based on the one among the obtained UI elements being identified to be the application start-up button, record, in the new automation script, a name of an application corresponding to the application start-up button;
   based on the one among the obtained UI elements being identified to be the keyboard, combine consecutive typing steps into a typed message, and record the typed message in the new automation script;
   based on the one among the obtained UI elements being identified to be the static UI element, record, in the new automation script, coordinates of a first input on the static UI element; and
   based on the one among the obtained UI elements being identified to be the non-static UI element, obtain an image of the non-static UI element, perform the object detection on a respective one of the captured last frame to obtain a bounding box of the non-static UI element, and perform the optical character recognition on the respective one of the captured last frame to obtain a text on the non-static UI element.

17. The non-transitory computer-readable storage medium of claim 16, wherein the instructions further cause the processor to:
   identify whether a task included in the existing automation script is one among an application start-up event, a keyboard interaction, the first input on the static UI element and a second input on the non-static UI element;
   based on the task being identified to be the application start-up event, launch the application based on the recorded name of the application;
   based on the task being identified to be the keyboard interaction, type the recorded typed message;
   based on the task being identified to be the first input on the static UI element, perform the first input on the recorded coordinates of the first input on the static UI element; and
   based on the task being identified to be the second input on the non-static UI element, obtain a location of the non-static UI element, based on the obtained image of the non-static UI element, the obtained bounding box of the non-static UI element, and the obtained text on the non-static UI element, and perform the second input on the obtained location of the non-static UI element.

* * * * *